United States Patent
Park

(10) Patent No.: US 9,233,684 B2
(45) Date of Patent: Jan. 12, 2016

(54) METHOD AND SYSTEM FOR LEARNING AND CONTROLLING TORQUE TRANSMISSION KISS POINT OF ENGINE CLUTCH FOR HYBRID ELECTRIC VEHICLE

(71) Applicants: Hyundai Motor Company, Seoul (KR); Kia Motors Corporation, Seoul (KR)

(72) Inventor: Joonyoung Park, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 216 days.

(21) Appl. No.: 13/711,208

(22) Filed: Dec. 11, 2012

(65) Prior Publication Data

US 2014/0067174 A1    Mar. 6, 2014

(30) Foreign Application Priority Data

Sep. 6, 2012  (KR) .................. 10-2012-0098868

(51) Int. Cl.
*B60W 20/00*    (2006.01)
*B60W 10/02*    (2006.01)
(Continued)

(52) U.S. Cl.
CPC .............. *B60W 20/40* (2013.01); *B60W 10/02* (2013.01); *B60W 30/18054* (2013.01);
(Continued)

(58) Field of Classification Search
CPC ................ B60W 20/40; B60W 10/02; B60W 2050/0088; B60W 2510/081; B60W 2510/083; B60W 30/18054; F16D 2500/30808; F16D 2500/5018; F16D 2500/50245; F16D 2500/50251; F16D 2500/50263; F16D 2500/5045; F16D 2500/70406; F16D 2500/70408; F16D 2500/70454; F16D 2500/70458; F16D 48/06; F16D 48/064; F16D 2500/50275; F16D 2500/50266; F16D 2500/50269; F16D 2500/50281; F16D 2500/1026; F16D 2500/10412; F16D 2500/1045; F16D 2500/1066; F16D 2500/1085; F16D 2500/3024; F16D 2500/3027; F16D 2500/3065; F16D 2500/3067; F16H 2061/0087; F16H 2061/064; F16H 2342/042; F16H 61/061; B60Y 2300/427; Y02T 10/7258
USPC .................. 701/22, 60, 61, 67; 903/903, 902; 180/65.275; 477/15
See application file for complete search history.

(56) References Cited

U.S. PATENT DOCUMENTS 5,337,868 A * 8/1994 Liu et al. .................. 477/74
5,393,274 A * 2/1995 Smedley .................. 477/74
(Continued)

FOREIGN PATENT DOCUMENTS

JP        2010143448 A    7/2010
KR    10-2010-0048567    5/2010
(Continued)

*Primary Examiner* — Calvin Cheung
*Assistant Examiner* — Angelina Shudy
(74) *Attorney, Agent, or Firm* — Mintz Levin Cohn Ferris Glovsky and Popeo, P.C.; Peter F. Corless

(57) ABSTRACT

Disclosed a system and method of learning and controlling a torque transmission kiss point of an engine clutch. In particular, a determination is made as to whether power transference to a transmission transmitting an output from the engine and the motor has been interrupted, and whether the engine is being driven. The motor is then controlled so that a speed of the motor is maintained at a set speed different from a speed of revolutions of the engine when the power transference to the transmission has been interrupted and the engine is being driven. A state change of the motor is then detected while increasing hydraulic pressure applied to the engine clutch at a set ratio and a torque transmission kiss point of the engine clutch is calculated based on the state change of the motor.

11 Claims, 8 Drawing Sheets

(51) Int. Cl.
*B60W 30/18* (2012.01)
*F16D 48/06* (2006.01)
*F16H 61/06* (2006.01)
*B60W 50/00* (2006.01)

(52) U.S. Cl.
CPC ............ *F16D 48/06* (2013.01); *F16H 61/061* (2013.01); *B60W 2050/0088* (2013.01); *B60W 2510/081* (2013.01); *B60W 2510/083* (2013.01); *B60Y 2300/427* (2013.01); *F16D 2500/1026* (2013.01); *F16D 2500/1045* (2013.01); *F16D 2500/1066* (2013.01); *F16D 2500/1085* (2013.01); *F16D 2500/10412* (2013.01); *F16D 2500/3024* (2013.01); *F16D 2500/3027* (2013.01); *F16D 2500/3065* (2013.01); *F16D 2500/3067* (2013.01); *F16D 2500/30808* (2013.01); *F16D 2500/5045* (2013.01); *F16D 2500/50245* (2013.01); *F16D 2500/50251* (2013.01); *F16D 2500/50263* (2013.01); *F16D 2500/70406* (2013.01); *F16D 2500/70408* (2013.01); *F16D 2500/70454* (2013.01); *F16D 2500/70458* (2013.01); *F16H 2061/064* (2013.01); *F16H 2342/042* (2013.01); *Y02T 10/7258* (2013.01)

(56) References Cited

U.S. PATENT DOCUMENTS

| | | | | |
|---|---|---|---|---|
| 6,018,198 | A * | 1/2000 | Tsuzuki et al. | 290/17 |
| 6,083,138 | A * | 7/2000 | Aoyama et al. | 477/5 |
| 6,142,909 | A * | 11/2000 | Drexl | B60W 10/02 477/91 |
| 6,364,807 | B1 * | 4/2002 | Koneda et al. | 477/5 |
| 6,655,485 | B1 * | 12/2003 | Ito et al. | 180/65.6 |
| 7,938,209 | B2 * | 5/2011 | Dilzer et al. | 180/65.28 |
| 8,113,987 | B2 * | 2/2012 | Kumazaki et al. | 477/15 |
| 9,108,635 | B2 * | 8/2015 | Miyazaki | B60K 6/48 |
| 2002/0086769 | A1 * | 7/2002 | Hemmingsen et al. | 477/79 |
| 2002/0170758 | A1 * | 11/2002 | Shimabukuro et al. | 180/65.2 |
| 2005/0245350 | A1 * | 11/2005 | Tabata et al. | 477/34 |
| 2007/0087894 | A1 * | 4/2007 | Tsuneyoshi et al. | 477/3 |
| 2008/0006457 | A1 * | 1/2008 | Fujimoto et al. | 180/65.1 |
| 2008/0318730 | A1 * | 12/2008 | Endo | 477/52 |
| 2009/0112426 | A1 * | 4/2009 | Reber | 701/62 |
| 2009/0234524 | A1 * | 9/2009 | Kim | 701/22 |
| 2010/0004837 | A1 * | 1/2010 | Connolly et al. | 701/68 |
| 2010/0114443 | A1 * | 5/2010 | Terwart et al. | 701/68 |
| 2011/0212809 | A1 * | 9/2011 | Tsutsui et al. | 477/5 |
| 2012/0109439 | A1 * | 5/2012 | Akebono et al. | 701/22 |
| 2013/0297115 | A1 * | 11/2013 | Doering et al. | 701/22 |
| 2014/0067174 | A1 * | 3/2014 | Park | 701/22 |
| 2014/0136066 | A1 * | 5/2014 | Cho et al. | 701/68 |
| 2014/0162839 | A1 * | 6/2014 | Miyazaki et al. | 477/5 |
| 2015/0258982 | A1 * | 9/2015 | Tanaka | B60K 6/36 477/5 |

FOREIGN PATENT DOCUMENTS

| | | |
|---|---|---|
| KR | 10-2011-0033455 | 3/2011 |
| WO | WO 2014021234 A1 * | 2/2014 |

* cited by examiner

METHOD AND SYSTEM FOR LEARNING AND CONTROLLING TORQUE TRANSMISSION KISS POINT OF ENGINE CLUTCH FOR HYBRID ELECTRIC VEHICLE

CROSS-REFERENCE TO RELATED APPLICATION

This application claims priority to and the benefit of Korean Patent Application No. 10-2012-0098868 filed in the Korean Intellectual Property Office on Sep. 6, 2012, the entire contents of which are incorporated herein by reference.

BACKGROUND (a) Field of the Invention

The present invention relates to a method and a system for learning and controlling a torque transmission kiss point of an engine clutch for a hybrid electric vehicle, and more particularly, to a method and a system for learning and controlling a torque transmission kiss point of an engine clutch by gradually increasing hydraulic pressure of the engine clutch around a previous torque transmission kiss point when a uniform relative speed is maintained between an engine and a motor in a no-load state to sense a change of torque of the engine and the motor or a change of a speed of the motor.

(b) Description of the Related Art

In general, a hybrid electric vehicle may reduce exhaust gas and improve fuel efficiency by using a motor as a power source, as well as an engine. In the hybrid electric vehicle, as illustrated in FIG. 1, an engine 11, a driving motor 12, and a transmission 13 may be arranged in series. It should be noted, however, that hybrid electric vehicles may be arranged in many different configurations, including in parallel, in which case the engine and the motor are engaged and disengaged from the transmission accordingly.

In the hybrid electric vehicle 10, an engine clutch 14 for transmitting driving power and blocking the transmission of the driving power may be disposed between the engine 11 and the driving motor 12. FIG. 2 is a conceptual diagram of the engine clutch 14.

As illustrated in FIG. 2, the engine clutch 14 may include a friction material PE moving via pressure (hydraulic pressure) from a fluid (oil) FL of which a quantity is controlled by an operation of a solenoid valve SOL and a return spring SP for restoring the friction material PE to its original state when operation hydraulic pressure is not applied to the friction material PE. The solenoid valve SOL is generally controlled by a current.

The solenoid valve SOL is operated so that hydraulic pressure applied to the friction material PE increases as current applied to the solenoid valve SOL increases. When the hydraulic pressure applied to the friction material PE increases, contact frictional force of the friction material PE increases. Accordingly, as illustrated in FIG. 3, torque transmitted by the engine clutch 14 is increased in proportion to the current applied to the solenoid valve SOL.

In the meantime, in the hybrid electric vehicle 10, an integrated starter and generator (ISG) 15 for operating the engine 11 or serving as a generator may be mounted in the engine 11. The ISG 15 may be called a hybrid starter and generator (HSG) in vehicle manufacturing The hybrid electric vehicle 10 may run in an electric vehicle (EV) mode that is that utilizes only power from the driving motor 12 to provide a driving force to the transmission and output shaft. Further, the hybrid vehicle 10 may also run in a hybrid electric vehicle (HEV) mode using torque from the engine 11 as main power and torque of the driving motor 12 an auxiliary power. Further, the hybrid electric vehicle 10 may run in a regenerative braking (RB) mode in which braking and inertia energy of the vehicle is collected through power generated by the motor and the battery is charged when the vehicle 10 brakes or runs by inertia.

As described above, the hybrid electric vehicle 10 operates the engine clutch 14 in order to transmit power or separate power between the driving motor 12 and the engine 11 for switching the mode and the like. Operation hydraulic pressure from the engine clutch during an operation of the engine clutch 14 considerably influence drivability, power performance, and fuel efficiency of the hybrid electric vehicle, so that the operation hydraulic pressure of the engine clutch needs to be accurately controlled.

The operation hydraulic pressure of the engine clutch 14 may be determined from the initial hydraulic pressure by which torque is initially transmitted (i.e., a sleep state) and feedback hydraulic pressure for adjusting the hydraulic pressure of the engine clutch 14 by receiving feedback of speeds of the engine 11 and the driving motor 12. More specifically, a sleep state is started as both ends of the friction material PE of the engine clutch 14 come in contact with each other, The initial hydraulic pressure point at which torque is initially transmitted may be referred to as a kiss point, an initial duty, a biting point, and a dead zone within the vehicle manufacturing field. Current applied at the initial hydraulic pressure point, substantially to the solenoid valve corresponding to the initial hydraulic pressure point, is indicated by KP in FIG. 3.

As illustrated in FIG. 3, the initial hydraulic pressure point KP of the engine clutch 14 corresponds to the point at which torque transmission from the engine clutch is started, so that the engine clutch may substantially transmit the power from this time point. Accordingly, in the present specification, the initial hydraulic pressure point may be called as a torque transmission kiss point or torque transmission kiss point hydraulic pressure for the convenience of description. The torque transmission kiss point exerts significant influence on an operation time and an operation state of the engine clutch 14.

Even though the torque transmission kiss point is optimally set in the engine clutch 14 when a corresponding vehicle is released, the torque transmission kiss point may be changed according to a difference between respective components of the engine clutch, for example, component assembling tolerance, characteristic deviation of current-versus-pressure of the solenoid valve, and characteristic deviation according to passage of usage period. That is, as illustrated by a dotted line in FIG. 3, the torque transmission kiss point may be changed during the use of the engine clutch.

Accordingly, it is necessary to control hydraulic pressure of the engine clutch so that the engine clutch may transmit the torque at an appropriate point in time by learning the torque transmission kiss point of the engine clutch while the hybrid electric vehicle is running.

In a conventional method of learning the torque transmission kiss point, hydraulic pressure at a moment in time at which the engine starts to move by gradually increasing hydraulic pressure applied to the friction material of the engine clutch in a driving state where the engine is stopped and the engine clutch is released, that is, the moment at which a speed of the engine is output, is set as the torque transmission kiss point. However, the conventional art does not consider frictional coefficient deviation of the friction material of the engine clutch, deviation of the return spring, and the characteristic change deviation according to usage. As a result, the conventional learning method is not effective.

Further, in the conventional art, learning may be affected by applying excessive hydraulic pressure characteristics of the pressure while increasing the hydraulic pressure of the engine clutch.

The above information disclosed in this Background section is only for enhancement of understanding of the background of the invention and therefore it may contain information that does not form the prior art that is already known in this country to a person of ordinary skill in the art.

SUMMARY

The present invention has been made in an effort to provide a method and a system for learning and controlling a torque transmission kiss point of an engine clutch for a hybrid electric vehicle which accurately learns a torque transmission kiss point of an engine clutch by gradually increasing hydraulic pressure of the engine clutch around a previous torque transmission kiss point (or initial torque transmission kiss point) when a uniform relative speed is maintained between an engine and a motor in a no-load state to sense a change of torque of the engine and the motor or a change of a speed of the motor.

An exemplary embodiment of the present invention provides a method of learning a torque transmission kiss point of an engine clutch of a hybrid electric vehicle, in which a point at which an engine clutch of a hybrid electric vehicle driven by output of an engine and a motor, which are engaged and disengaged via the engine clutch, starts to transmit torque is learned and controlled, the method including: determining, by a controller, whether power transference to a transmission transmitting an output from the engine and the motor is interrupted; determining, by the controller, whether the engine is being driven; controlling, by the controller, the motor so that a speed of the motor is maintained at a set speed different from a revolution speed of the engine when the power transference of the transmission is interrupted and the engine is being driven; detecting a state change of the motor while increasing hydraulic pressure applied to the engine clutch at a set ratio; and calculating a torque transmission kiss point of the engine clutch based on the state change of the motor.

The detecting of the state change of the motor while increasing the hydraulic pressure applied to the engine clutch by the set ratio may include increasing the applied hydraulic pressure in a stepwise manner. The transmission may be an automatic transmission, and when the transmission is in Park or Neutral, it may be determined that the power transference of the transmission is interrupted.

The state change of the motor may be a change of torque or a change of a speed of the motor. Furthermore, the motor may control the speed of the motor to be zero and control the engine to reach a target idle speed.

The method may further include: when the speed of the engine reaches the set target idle speed, measuring torque of the engine and storing the measured torque of the engine, and detecting a state change of the engine while increasing the hydraulic pressure applied to the engine clutch at a set ratio; and calculating the torque transmission kiss point of the engine clutch based on the state change of the engine.

The state change of the engine may be a change of torque or a change of a speed of the engine. Idle control of the engine may be performed by using an integrated starter and generator (ISG) starting the engine or generating power in the hybrid electric vehicle. Furthermore, determining whether power transference of the transmission is interrupted may include determining whether the transmission is in a D stage and a vehicle speed is zero.

Another exemplary embodiment of the present invention provides a method of learning a torque transmission kiss point of an engine clutch of a hybrid electric vehicle, in which a point at which an engine clutch of a hybrid electric vehicle driven by output of an engine and a motor, which are engaged and disengaged via the engine clutch, starts to transmit torque is learned and controlled, the method including: when power transference to a transmission transmitting output from the engine and the motor is interrupted, entering learning of a torque transmission kiss point; controlling torque of the motor to be zero and controlling a speed of the engine to reach a target idle speed after entering the learning; when the speed of the engine reaches the target idle speed, measuring a speed of the motor rotated by the target idle speed and viscosity frictional force of the engine clutch and storing the measured speed; detecting a change of the speed of the motor while increasing hydraulic pressure applied to the engine clutch at a set ratio; and setting set hydraulic pressure when the change of the speed of the motor is greater by a predetermined value or more than the speed of the motor by the viscosity frictional force as new torque transmission kiss point hydraulic pressure.

Yet another exemplary embodiment of the present invention provides a system for learning a torque transmission kiss point of an engine clutch of a hybrid electric vehicle, the system including: an engine clutch positioned between an engine and a motor of the hybrid electric vehicle to engage or disengage the engine and the motor; an integrated starter and generator (ISG) configured to start up the engine or generate power; a transmission configured to shift power applied to wheels according to an operation of a shift stage lever and provide the shifted power; and a control unit configured to learn the torque transmission kiss point of the engine clutch by controlling operation of the engine, the motor, the transmission, the ISG, and the engine clutch in an appropriate condition and checking the states of the engine, the motor, the transmission, the ISG, and the engine clutch, in which the control unit is operated via program instructions for performing the aforementioned method of the exemplary embodiment of the present invention.

As described above, according to the exemplary embodiments of the present invention, it is possible to accurately learn a torque transmission kiss point of the engine clutch by gradually increasing hydraulic pressure of the engine clutch around a previous torque transmission kiss point (or initial torque transmission kiss point) when a uniform relative speed is maintained between an engine and a motor in a no-load state to sense a change of torque of the engine and the motor or a change of a speed of the motor.

According to the exemplary embodiments of the present invention, a relatively accurate torque and/or speed of the motor is used, so that it is possible to more accurately learn a torque transmission kiss point of the engine clutch. Accordingly, according to the exemplary embodiments of the present invention, it is possible to improve accuracy of control of the engine clutch, thereby improving drivability and fuel efficiency.

DETAILED DESCRIPTION OF THE EMBODIMENTS

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Additionally, it is understood that the below methods are executed by at least one controller. The term controller refers to a hardware device that includes a memory and a processor. The memory is configured to store the modules and the processor is specifically configured to execute said modules to perform one or more processes which are described further below.

Furthermore, the control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Hereinafter, exemplary embodiments of the present invention will be described in detail with reference to the accompanying drawings.

Figure 1:
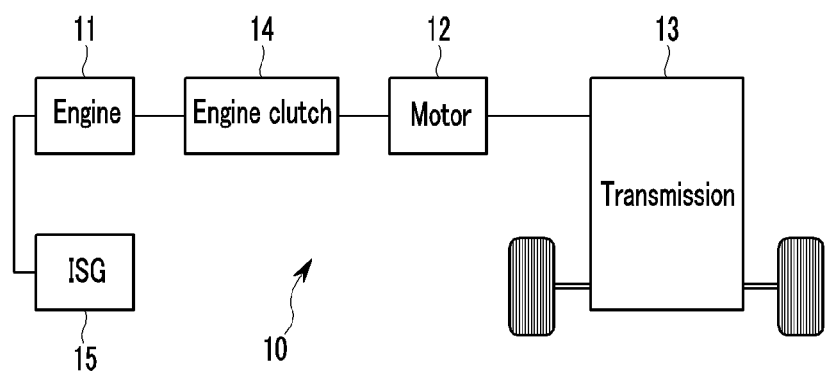
FIG. 1 is a schematic diagram illustrating a configuration of a general hybrid electric vehicle.
Figure 2:
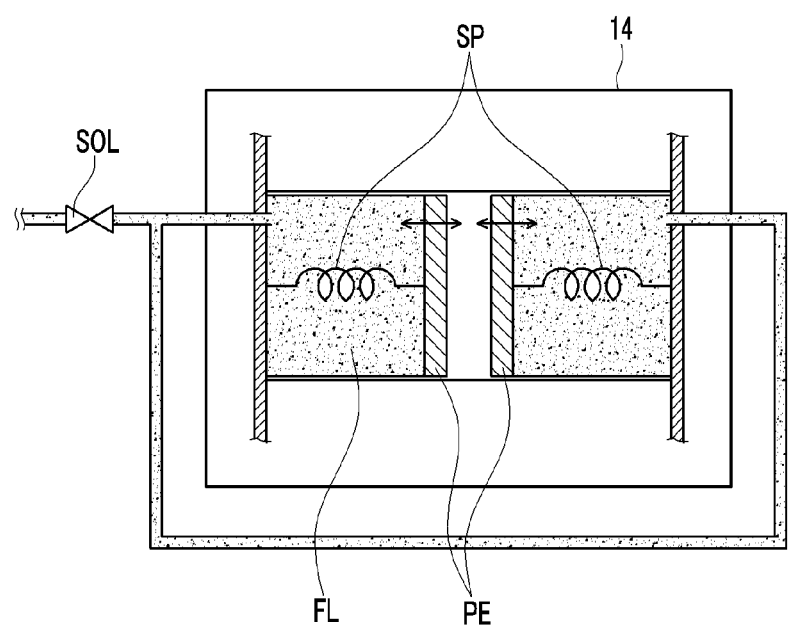
FIG. 2 is a schematic diagram illustrating a configuration of a general engine clutch.
Figure 3:
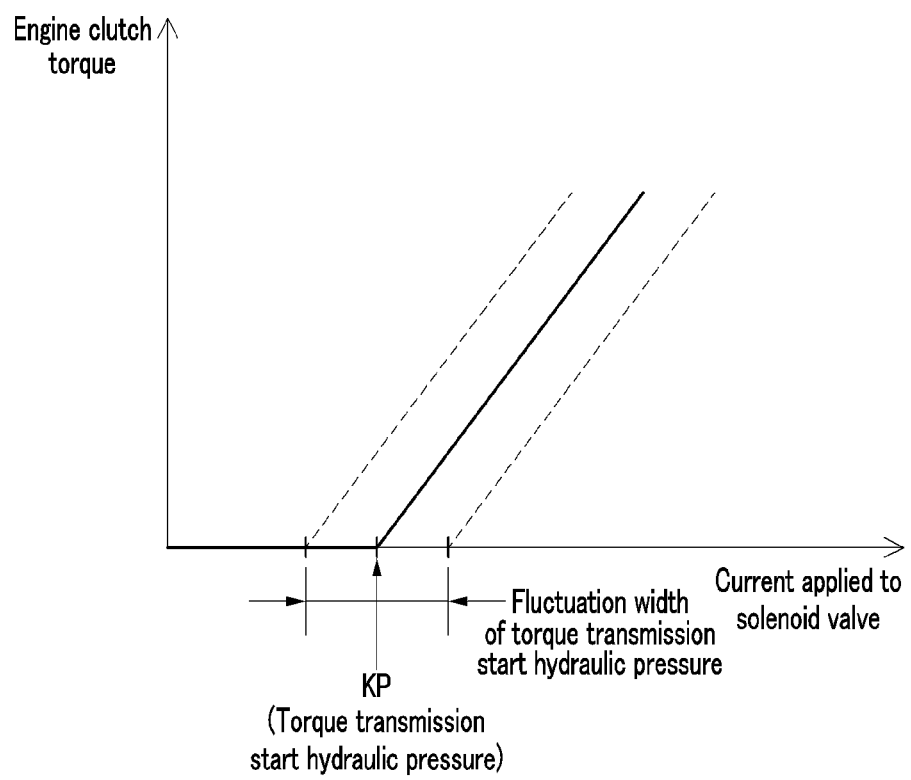
FIG. 3 is a graph for illustrating torque transmission kiss point hydraulic pressure of a general engine clutch.
Figure 4:
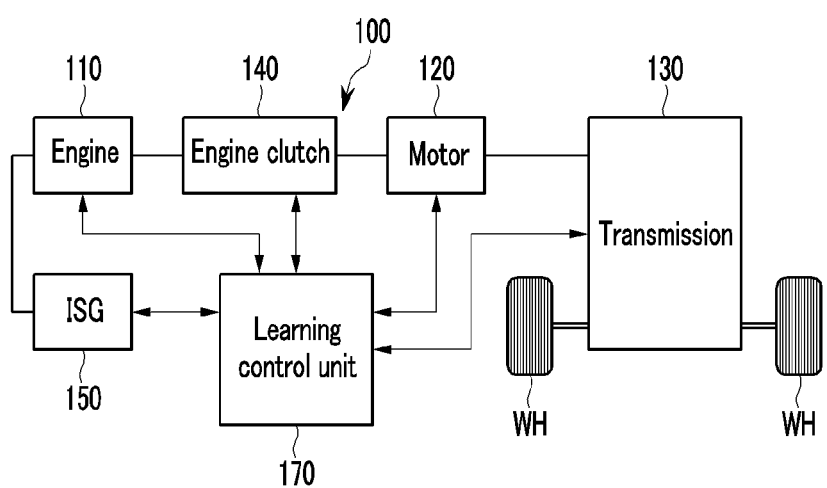
FIG. 4 is a configuration diagram of a system for learning and controlling a torque transmission kiss point of an engine clutch for a hybrid electric vehicle according to an exemplary embodiment of the present invention.

FIG. 4 is a block diagram schematically illustrating a system for learning and controlling a torque transmission kiss point of an engine clutch according to an exemplary embodiment of the present invention. The system for learning and controlling the torque transmission kiss point of the engine clutch according to the exemplary embodiment of the present invention is a system for learning a torque transmission kiss point of the engine clutch which engages and disengages an engine and a driving motor for operating in an EV mode or an HEV mode.

The system for learning and controlling the torque transmission kiss point of the engine clutch according to the exemplary embodiment of the present invention includes: an engine 110; a motor 120; a transmission 130 for varying driving power of the engine 110 and the motor 120 and transmitting the varied driving power to wheels (WH) or blocking transmission of the varied driving power; an engine clutch 140 positioned between the engine 110 and the motor 120 to join (couple/engage) or separate/disengage the engine 110 and the motor 120. An integrated starter and generator (ISG) 150 is provided to start the engine 10 or for generating power. A control unit (e.g., made up of one or more controllers operating as a unit) 170 for learning torque transmission kiss point hydraulic pressure of the engine clutch 140 by checking/monitoring states of the engine 110, the driving motor 120, the transmission 130, the ISG 150, and the engine clutch 140 while appropriately controlling driving of the engine 110, the driving motor 120, the transmission 130, the ISG 150, and the engine clutch 140 in an appropriate situation, which are included in a hybrid electric vehicle.

The engine 110, the driving motor 120, the transmission 130, the engine clutch 140, and the ISG 150 are components generally mounted in the hybrid electric vehicle 100, so that detailed descriptions thereof will be omitted in the present specification.

The control unit 170 may be made up of one or more microprocessors operated by program instructions executed thereon. This program instructions includes a series of commands for performing a method of learning and controlling a torque transmission kiss point of an engine clutch according to an exemplary embodiment of the present invention which will be described below.

In the exemplary embodiment of the present invention, the control unit 170 may include an engine control unit (ECU) for controlling the engine 110 of the hybrid electric vehicle 100, a motor control unit (MCU) for controlling the driving motor 120, and a hybrid control unit (HCU) for controlling a general operation of the hybrid electric vehicle 100. In the exemplary method of learning and controlling a torque transmission kiss point of an engine clutch according to an exemplary embodiment of the present invention which will be described below, some processes may be performed by the engine control unit, other processes may be performed by the motor control unit, and yet other processes may be performed by the hybrid control unit. However, it should be understood that the scope of the present invention is not limited to the exemplary embodiment to be described below. The control unit may be implemented with a combination different from that described in the exemplary embodiment of the present invention. Otherwise, the engine control unit, the motor control unit, and the hybrid control unit may perform a combination of processes different from that described in the exemplary embodiment of the present invention.

In the exemplary embodiment of the present invention, the engine control unit, the motor control unit, and the hybrid control unit included in the learning control unit 170 are generally mounted in the hybrid electric vehicle, so that configurations and operations thereof are obvious to those skilled in the art and thus detailed descriptions thereof will be omitted.

Hereinafter, a method of learning a torque transmission kiss point of an engine clutch of a hybrid electric vehicle according to an exemplary embodiment of the present invention will be described in detail with reference to the accompanying drawings.

Figure 5:
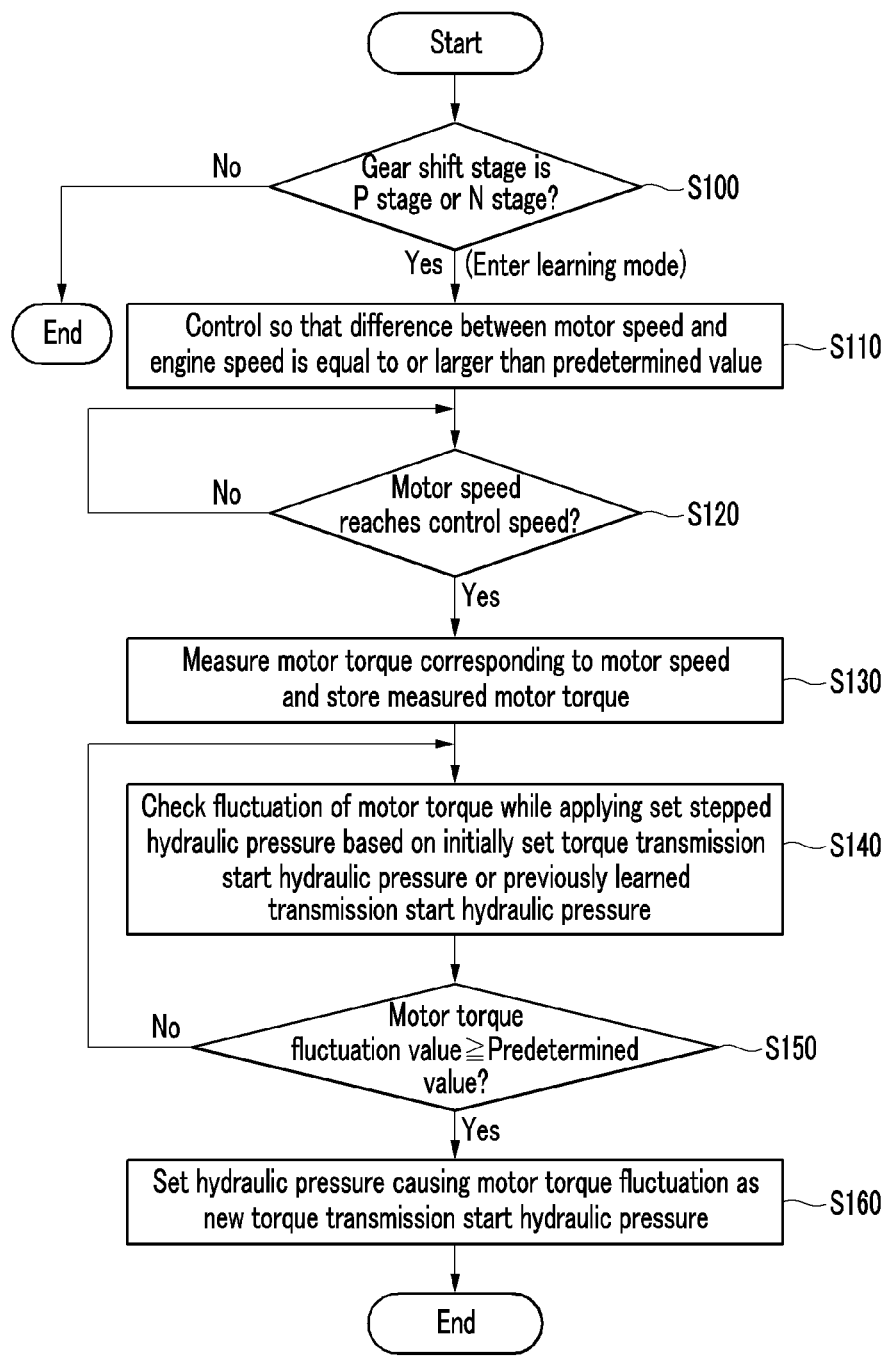
FIG. 5 is a flowchart of a method of learning and controlling a torque transmission kiss point of an engine clutch for a hybrid electric vehicle according to an exemplary embodiment of the present invention.

FIG. 5 is a flowchart illustrating a method of learning and controlling a torque transmission kiss point of an engine clutch of a hybrid electric vehicle according to an exemplary embodiment of the present invention. As illustrated in FIG. 5, when a gear shift stage is in Park (P) or Neutral (N), the learning control unit 170 enters a learning state (S100).

When the gear shift stage is in P or N, the engine 110 and the motor 120 are in a no-load state and the hybrid electric vehicle 100 is in a non-movement state. That is, when the gear shift stage is in P or N, an accelerator pedal is not generally operated (e.g., an opening accelerator position sensor is equal to 0%), so that the vehicle is not operated.

Accordingly, the control unit 170 of the exemplary embodiment of the present invention identifies whether the gear stage of the transmission 130 is in park (P) or neutral (N), and when the gear stage of the transmission 130 is in Park (P) or Neutral (N), the control unit 170 determines that the vehicle is not currently being operated, that is, the operation is not affected even though the learning progresses, so that the control unit 170 enters a learning mode.

After entering the learning mode, the control unit 170 controls a speed of the motor 120 so that a difference between a speed of the motor and a speed of the engine becomes equal to or greater than a predetermined value (S110). The predetermined value may be, for example, 100 to 500 revolutions per minute (RPM), but it should be understood that the scope of the present invention is not limited thereto. A predetermined value may be variably set in consideration of the states of the engine 110 and the motor 120 when a shift stage (i.e., Park, Neutral, Drive, etc.) of the transmission 130 of the hybrid electric vehicle 100 is in P or N even though the predetermined value is different from the aforementioned predetermined value. The technical spirit of the present invention may be applied to the case.

A control speed of the motor 120 may be set as, e.g., 100 to 1,000 RPM in consideration of an operation characteristic of the motor 120 and the predetermined value. Because the engine 110 may be stopped, a lower limit value of the control speed of the motor 120 may be set to, e.g., 100 RPM which is identical to the lower limit value of the predetermined value in the exemplary embodiment of the present invention.

When the difference between the speed of the motor and the speed of the engine is equal to or greater than the predetermined value by controlling the speed of the motor 120 to be a control speed (S120), the control unit 170 measures motor torque corresponding to the speed of the motor and stores the measured motor torque (S130). Controlling the speed of the motor and the technology for measuring and storing the speed of the motor and the motor torque are well understood by those skilled in the art, so that detailed descriptions thereof will be omitted.

Figure 6:
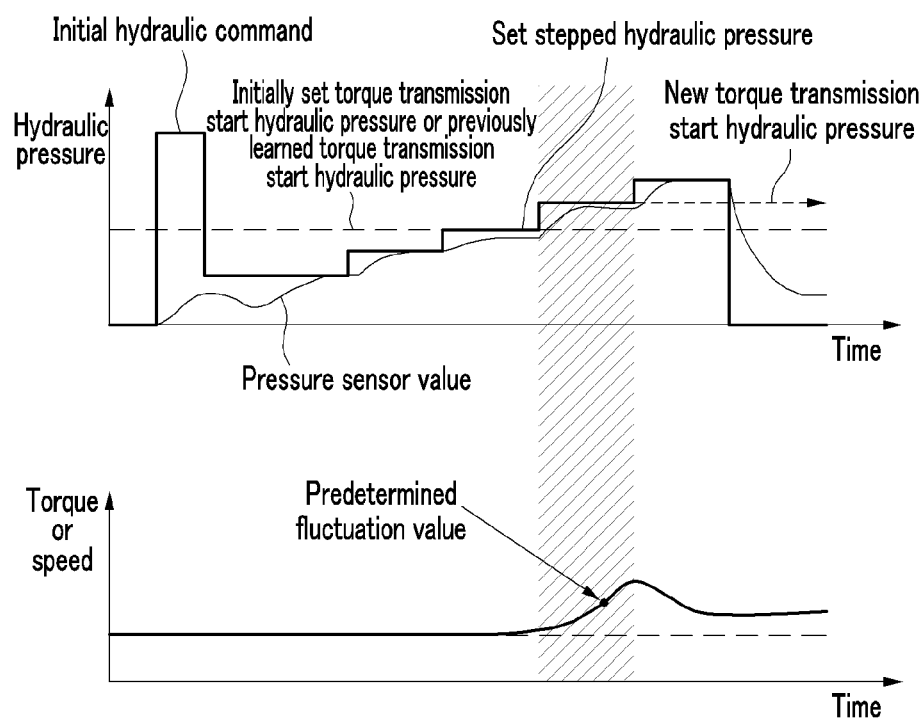
FIG. 6 is a graph of an operation of a method and a system for learning and controlling a torque transmission kiss point of an engine clutch for a hybrid electric vehicle according to an exemplary embodiment of the present invention.

After measuring the motor torque and storing the measured motor torque, the control unit 170 checks for fluctuations within the motor torque while applying set stepped hydraulic pressure based on the initially set torque transmission kiss point hydraulic pressure or previously learned torque transmission kiss point hydraulic pressure as illustrated in FIG. 6 to the engine clutch 140 (S140). The initially set torque transmission kiss point hydraulic pressure is the optimal torque transmission kiss point hydraulic pressure identified when the corresponding hybrid electric vehicle is researched and developed to be applied, not by the learning.

The first set stepped hydraulic pressure in the set stepped hydraulic pressure may be set as about 50% of the initially set torque transmission kiss point hydraulic pressure or the previously (shortly before) learned torque transmission kiss point hydraulic pressure, but the scope of the present invention is not limited thereto.

Further, the set stepped hydraulic pressure from the set step in the set stepped hydraulic pressure may be increased by about 30 to 50% from the previous stepped hydraulic pressure value, but the scope of the present invention is not limited thereto. When an increase width of the set hydraulic pressure in the set stepped hydraulic pressure is below a predetermined value (e.g., 30%), accurate learning may be achieved, but the learning time may increase. On the contrary, when the increase width of the set hydraulic pressure is above a predetermined value (e.g., 50%), accuracy of the learning may be deteriorated, but a learning time may decrease. Accordingly, the increase width of the set hydraulic pressure may be determined through significant experimental data.

Further, a step width (e.g., a time interval for increasing the set hydraulic pressure in a step form) in the set stepped hydraulic pressure may be determined based on a time at which hydraulic pressure corresponding to the control signal is stably generated in the engine clutch 140 after applying the control signal to the solenoid valve SOL of the engine clutch 140, that is, a hydraulic pressure stabilization time. In this case, the hydraulic pressure stabilization time is affected by the temperature of the oil, thus the temperature of the oil may be referred to as well. For example, when the hydraulic pressure stabilization time in consideration of the temperature of the oil is about 1 to 3 seconds, the step width of the set stepped hydraulic pressure may be set to about 1 to 3 seconds. Initial command hydraulic pressure applied before the application of the set stepped hydraulic pressure in FIG. 6, which is hydraulic pressure for preparing an operation of the engine clutch 140, may be understood as hydraulic pressure for initially filling a vacant space inside of the engine clutch 140 with oil.

When the control unit 170 checks the fluctuation of the motor torque while applying the set stepped hydraulic pressure after applying the initial command hydraulic pressure, and the fluctuation of the motor torque is greater than or equal to the predetermined value (S150), the control unit 170 updates the hydraulic pressure to a new torque transmission kiss point hydraulic pressure and uses the updated torque transmission kiss point hydraulic pressure as torque transmission kiss point hydraulic pressure in later processing (S160).

The fact that the fluctuation of the motor torque is equal to or greater than the predetermined value means that the engine clutch 140 starts to enter a sleep state so that the torque transmission is initiated through the engine clutch 140, so that the hydraulic pressure at this time is set as the new torque transmission kiss point hydraulic pressure. The predetermined value may be set to a value that is about 10 to 30% of the motor torque stored in step S130, but the scope of the present invention is not limited thereto.

Accordingly, when the torque transmission kiss point hydraulic pressure is newly learned and set, the control unit 170 may accurately control the torque transmission kiss point hydraulic pressure of the engine clutch 140 by applying a current value corresponding to the newly set torque transmission kiss point hydraulic pressure to the solenoid valve SOL when controlling the engine clutch 140 later.

Figure 7:
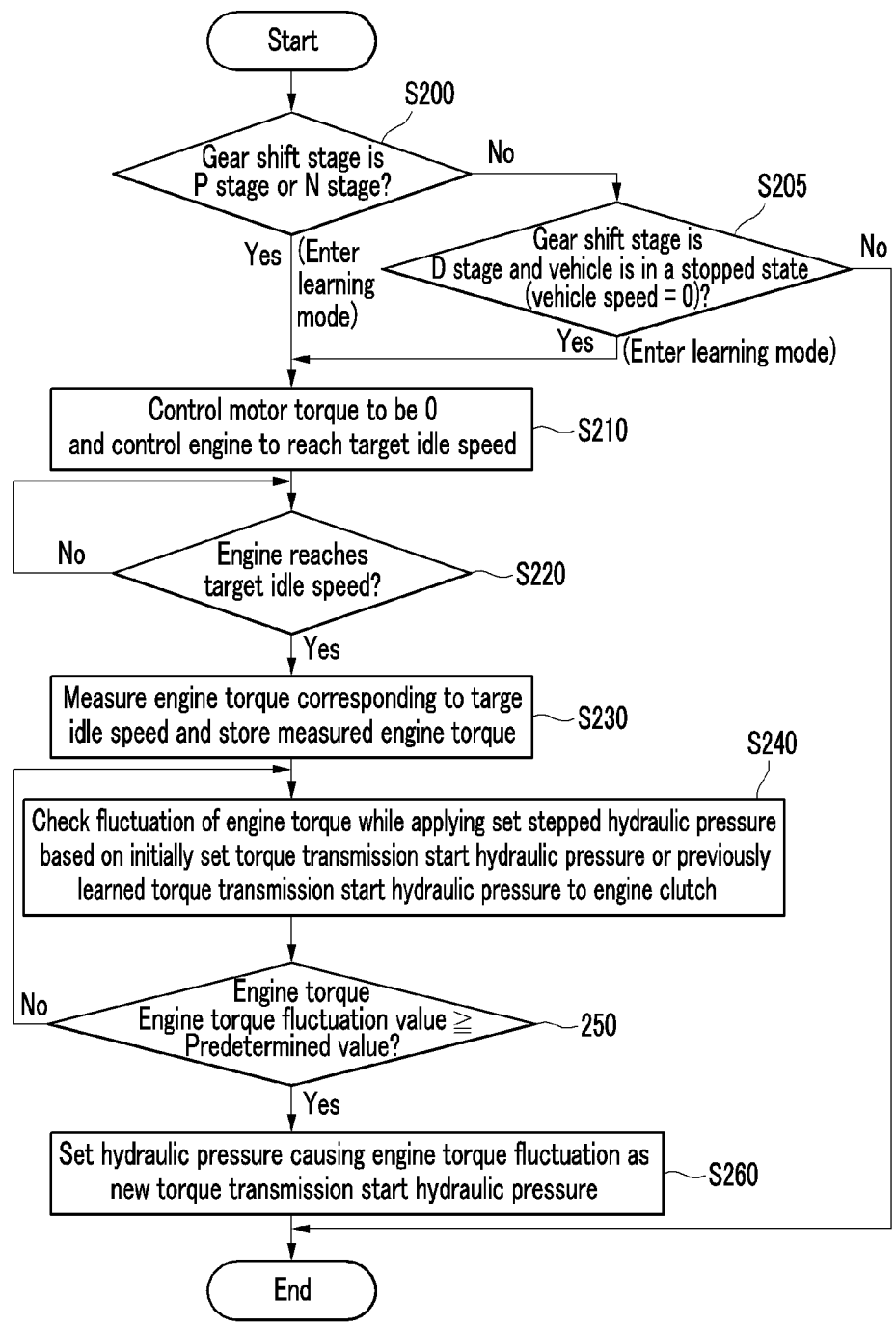
FIG. 7 is a flowchart of a method of learning and controlling a torque transmission kiss point of an engine clutch for a hybrid electric vehicle according to another exemplary embodiment of the present invention.

FIG. 7 is a flowchart illustrating a method of learning and controlling a torque transmission kiss point of an engine clutch of a hybrid electric vehicle according to another exemplary embodiment of the present invention. When the gear shift stage is in Park (P) or neutral (N), the control unit 170 in the exemplary embodiment of the present invention illustrated in FIG. 7 enters the learning mode (S200). Further, when the gear shift stage is in drive (D) but the hybrid electric vehicle 100 is stopped, that is, a vehicle speed is zero, the control unit 170 may also enter the learning mode (S205) at this point as well.

When the gear shift stage is the P or N or the gear shift stage is in D but the vehicle is stopped, and the accelerator pedal is not being operated (in a state where opening of the accelerator position sensor is 0%), it may be determined that the vehicle is not being operated.

Accordingly, in another exemplary embodiment of the present invention, the control unit 170 identifies whether the gear stage of the transmission 130 is in P or N, or the gear stage of the transmission 130 is in D but the vehicle speed is zero, and when the gear stage of the transmission 130 is in P or N, or the gear stage of the transmission 130 is in D but the vehicle speed is zero, the control unit 170 determines that the vehicle is in a non-operated state. That is, the operation is not influenced even though the learning progresses, and therefore enters the learning mode.

After entering the learning mode, the control unit 170 controls the speed of the motor 120 to be zero and controls the engine 110 to reach a target idle speed (for example, about 700 to 800 RPM) (S210). The control unit 170 may use torque from the engine and/or torque from the ISG 150 to control the engine 110 to reach the target idle speed.

When the number of revolutions of the engine 110 reaches the target idle speed under the control of the control unit 170 (S220), the control unit 170 measures engine torque at the target idle speed and stores the measured engine torque (S230). A technology for measuring the engine torque and storing the measured engine torque is well understood by those skilled in the art, so that a detailed description thereof will be omitted.

After measuring the engine torque and storing the measured engine torque, the control unit 170 checks fluctuation of the engine torque while applying set stepped hydraulic pressure based on initially set torque transmission kiss point hydraulic pressure or previously learned torque transmission kiss point hydraulic pressure as illustrated in FIG. 6 to the engine clutch 140 (S240). The set stepped hydraulic pressure used in another exemplary embodiment of the present invention illustrated in FIG. 7 is the same as the set stepped hydraulic pressure illustrated in FIG. 6 used in the description of the exemplary embodiment of the present invention according to FIG. 5.

Similar to the case of the exemplary embodiment according to FIG. 5, in the exemplary embodiment according to FIG. 7, the control unit 170 checks the fluctuation of the engine torque while applying the set stepped hydraulic pressure after applying the initial command hydraulic pressure. In this case, when the fluctuation of the engine torque is equal to or greater than a predetermined value (S250), the control unit 170 updates the hydraulic pressure at this time to new torque transmission kiss point hydraulic pressure and uses the updated torque transmission kiss point hydraulic pressure as the torque transmission kiss point hydraulic pressure later (S260).

The fact that the fluctuation of the engine torque is equal to or greater than the predetermined value means that the engine clutch 140 starts to sleep so that the torque transmission is started through the engine clutch 140. The predetermined value may be set to a value that is about 10 to 30% of the engine torque stored in step S230, but the scope of the present invention is not limited thereto.

Accordingly, when the torque transmission kiss point hydraulic pressure is newly learned and set, the control unit 170 may accurately control the torque transmission kiss point hydraulic pressure of the engine clutch 140 by applying a current value corresponding to the newly set torque transmission kiss point hydraulic pressure to the solenoid valve SOL when controlling the engine clutch 140 later.

Figure 8:
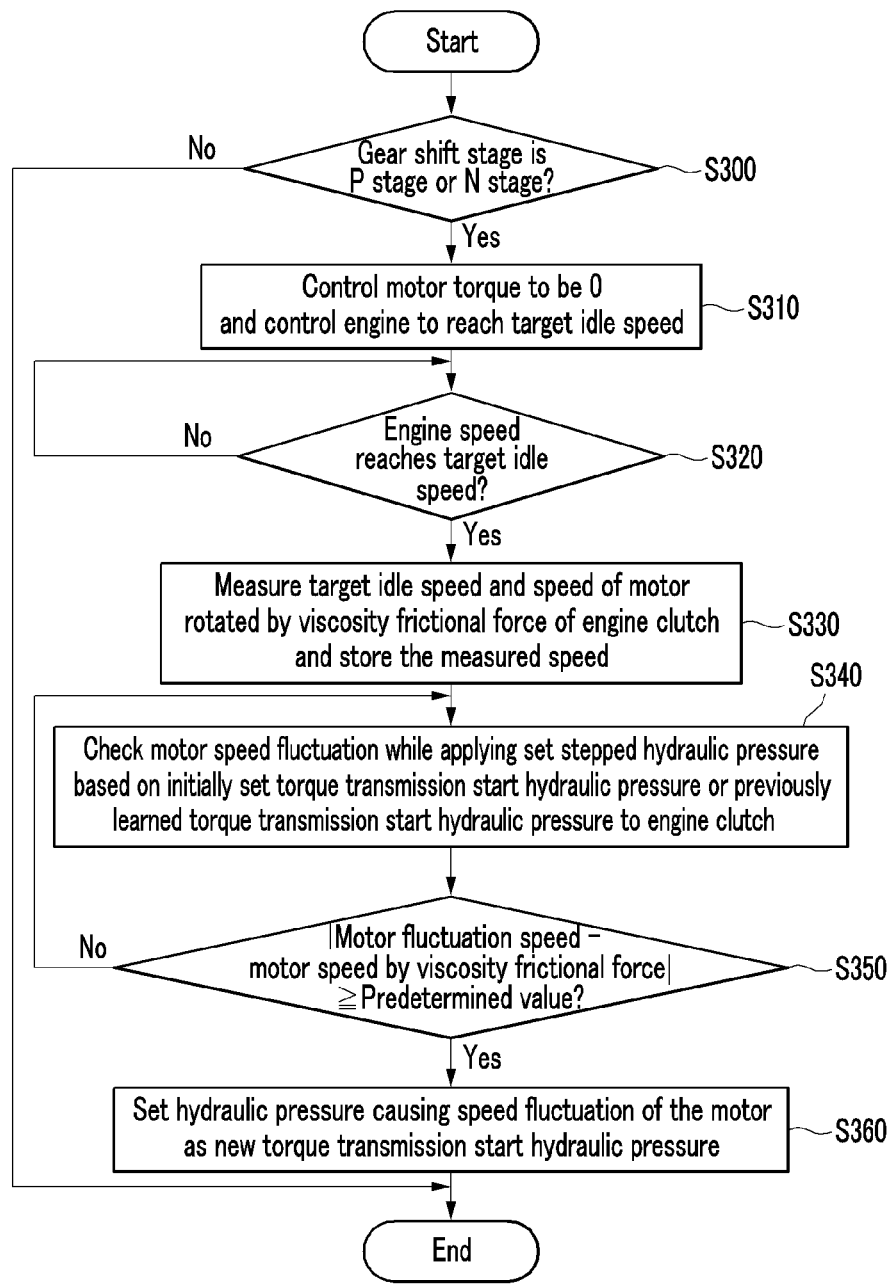
FIG. 8 is a flowchart of a method of learning and controlling a torque transmission kiss point of an engine clutch for a hybrid electric vehicle according to yet another exemplary embodiment of the present invention.

FIG. 8 is a flowchart illustrating a method of learning and controlling a torque transmission kiss point of an engine clutch of a hybrid electric vehicle according to another exemplary embodiment of the present invention. When the gear shift stage is in P or N the control unit 170 in the exemplary embodiment of the present invention illustrated in FIG. 8 enters the learning mode (S300).

When the gear shift stage is in P or N, an accelerator pedal is not generally operated (i.e., the opening of an accelerator position sensor is 0%), so that the vehicle is not being operated. Accordingly, the control unit 170 of another exemplary embodiment of the present invention identifies whether the gear stage of the transmission 130 is in P or N, and when the gear stage of the transmission 130 is in P or N, the control unit 170 determines that the vehicle is not being operated, that is, the operation is not affected even though the learning progresses, so that the control unit 170 enters a learning mode.

After entering the learning mode, the control unit 170 controls torque of the motor 120 to be zero and controls the engine 100 to reach a target idle speed (for example, about 700 to 800 RPM) (S310). The control unit 170 may use torque of the engine and/or torque of the ISG 150 to control the engine 110 to reach the target idle speed.

When the number of revolutions of the engine 110 reaches the target idle speed under the control of the control unit 170 (S320), the control unit 170 measures a speed of the motor 120 rotated by the target idle speed and viscosity frictional force of fluid (oil) of an engine clutch 140 and stores the measured speed of the motor 120 (S330). A technology for measuring the speed of the motor and storing the measured speed of the motor is well understood by those skilled in the art, so that a detailed description thereof will be omitted.

After measuring the speed of the motor 120 rotated by the target idle speed and the viscosity frictional force of the engine clutch 140 and storing the measured speed, the control unit 170 checks fluctuation of the speed of the motor 120 while applying set stepped hydraulic pressure based on initially set torque transmission kiss point hydraulic pressure or previously learned torque transmission kiss point hydraulic pressure as illustrated in FIG. 6 to the engine clutch 140 (S340).

The set stepped hydraulic pressure used in another exemplary embodiment of the present invention illustrated in FIG. 8 is the same as the set stepped hydraulic pressure illustrated in FIG. 6 used in the description of the exemplary embodiment of the present invention according to FIG. 5.

Similar to the case of the exemplary embodiment according to FIG. 5, in the exemplary embodiment according to FIG. 8, the control unit 170 checks the fluctuation of the speed of the motor 120 while applying the set stepped hydraulic pressure after while applying the initial command hydraulic pressure. In this case, when an absolute value of a difference between the value of the fluctuated speed of the motor and the value of the motor speed stored in step S330 is equal to or greater than a predetermined value (S350), the control unit 170 updates the hydraulic pressure at this time to new torque transmission kiss point hydraulic pressure and uses the updated torque transmission kiss point hydraulic pressure as the torque transmission kiss point hydraulic pressure (S360).

The fact that the absolute value of the difference between the value of the fluctuated speed of the motor and the value of the motor speed stored in step S330 is equal to or greater than the predetermined value means that the engine clutch 140 starts to sleep so that the torque transmission is started through the engine clutch 140.

Accordingly, when the torque transmission kiss point hydraulic pressure is newly learned and set, the control unit 170 may accurately control the torque transmission kiss point hydraulic pressure of the engine clutch 140 by applying a current value corresponding to the newly set torque transmission kiss point hydraulic pressure to the solenoid valve SOL when controlling the engine clutch 140 later.

In the meantime, when the gear shift stage is changed to D or reverse (R) or a driver operates the accelerator pedal so that opening of the accelerator pedal is at least about 1 to 5 degrees during the progress of the learning process of the exemplary embodiments of the present invention, the learning process may be terminated.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

<Description of symbols>

| | |
|---|---|
| 100: Hybrid electric vehicle | 110: Engine |
| 120: Motor (driving motor) | 130: Transmission |
| 140: Engine clutch | 170: Control unit |
| FL: Fluid (oil) | PE: Friction material |
| SOL: Solenoid valve | |

What is claimed is:

1. A method of learning a torque transmission kiss point of an engine clutch of a hybrid electric vehicle, in which a point at which the engine clutch of the hybrid electric vehicle driven by output of an engine and a motor, which are connected or separated through the engine clutch, starts to transmit torque is learned and controlled, the method comprising:
   determining, by a control unit, whether power transference of a transmission transmitting the output from the engine and the motor has been interrupted;
   determining, by the control unit, whether the engine is on only when the power transference of the transmission has been interrupted;
   controlling, by the control unit, the motor so that a speed of the motor is maintained at a set speed different from a speed of the engine only when the power transference of the transmission has been interrupted and the engine is on;
   detecting, by the control unit, a state change of the motor while increasing hydraulic pressure applied to the engine clutch at a set ratio;
   calculating, by the control unit, a torque transmission kiss point of the engine clutch based on the state change of the motor; and
   applying the torque transmission kiss point of the engine clutch to a solenoid valve,
   wherein the transmission is an automatic transmission, and when the transmission is in park or neutral, the control unit determines that power transference from the transmission has been interrupted.

2. The method of claim 1, wherein:
   the detecting of the state change of the motor while increasing the hydraulic pressure applied to the engine clutch at the set ratio comprises increasing the applied hydraulic pressure in a step-like manner.

3. The method of claim 1, wherein:
   the state change of the motor is a change of torque or a change of a speed of the motor.

4. The method of claim 1, wherein:
   the controlling of the motor comprises controlling the speed of the motor to be zero and controlling the engine to reach a set target idle speed.

5. The method of claim 4, further comprising:
   when the speed of the engine reaches the set target idle speed, measuring, by the control unit, torque of the engine and storing the measured torque of the engine, and detecting, by the control unit, a state change of the engine while increasing the hydraulic pressure applied to the engine clutch at a set ratio; and
   calculating, by the control unit, the torque transmission kiss point of the engine clutch based on the state change of the engine.

6. The method of claim 5, wherein:
   the state change of the engine is a change of torque or a change of the speed of the engine.

7. The method of claim 5, wherein:
   idle control of the engine is performed by using an integrated starter and generator (ISG) starting the engine or generating power in the hybrid electric vehicle.

8. The method of claim 5, wherein:
   the determining whether power transference of the transmission has been interrupted comprises determining whether the transmission is in drive and a vehicle speed is zero.

9. A method of learning a torque transmission kiss point of an engine clutch of a hybrid electric vehicle, in which a point at which the engine clutch of the hybrid electric vehicle driven by output of an engine and a motor, which are engaged and disengaged through the engine clutch, starts to transmit torque is learned and controlled, the method comprising:
   monitoring, by a control unit, power transference of a transmission between the engine and the motor;
   once power transference of the transmission transmitting the output of the engine and the motor is interrupted, learning, by the control unit, a torque transmission kiss point of the engine clutch;
   controlling torque of the motor to be zero and controlling a speed of the engine to reach a target idle speed after beginning to learn the torque transmission kiss point;
   in response to the speed of the engine reaching the target idle speed, measuring a speed of the motor rotated due to a viscosity of the engine clutch and storing the measured speed within the control unit;
   detecting a change of the speed of the motor while increasing hydraulic pressure applied to the engine clutch at a set ratio;
   setting hydraulic pressure when the change of the speed of the motor is greater by a predetermined value or more than the speed of the motor by the viscosity as new torque transmission kiss point hydraulic pressure; and applying the torque transmission kiss point of the engine clutch to a solenoid valve, wherein the transmission is an automatic transmission, and when the transmission is in park or neutral, the control unit determines that power transference from the transmission has been interrupted.

10. A system for learning a torque transmission kiss point of an engine clutch of a hybrid electric vehicle, the system comprising:

an engine clutch positioned between an engine and a motor of the hybrid electric vehicle to engage and disengage the engine and the motor with a transmission, wherein the transmission is configured to shift power applied to wheels according to an operation of a shift stage lever and provide power accordingly;

an integrated starter and generator (ISG) configured to start up the engine or generate power; and a control unit configured to learn the torque transmission kiss point of the engine clutch by controlling driving of the engine, the motor, the transmission, the ISG, and the engine clutch in an appropriate condition and monitoring states of the engine, the motor, the transmission, the ISG, and the engine clutch, wherein the control unit executes program instructions via a processor that perform a method of learning a torque transmission kiss point of an engine clutch of a hybrid electric vehicle, the method comprising:

determining whether power transference of a transmission transmitting the output of the engine and the motor has been interrupted;

determining whether the engine is on only when the power transference of the transmission has been interrupted;

controlling the motor so that a speed of the motor is maintained at a set speed different from a revolution speed of the engine only when the power transference of the transmission is determined to have been interrupted and the engine is on;

detecting a state change of the motor while increasing hydraulic pressure applied to the engine clutch at a set ratio;

calculating a torque transmission kiss point of the engine clutch based on the state change of the motor; and applying the torque transmission kiss point of the engine clutch to a solenoid valve, wherein the transmission is an automatic transmission, and when the transmission is in park or neutral, the control unit determines that power transference from the transmission has been interrupted.

11. A non-transitory computer readable medium containing program instructions executed by a processor within a control unit, the computer readable medium comprising:

program instructions that determine whether power transference to a transmission transmitting an output from an engine and a motor has been interrupted;

program instructions that determine whether the engine is on only when the power transference of the transmission has been interrupted;

program instructions that control the motor so that a speed of the motor is maintained at a set speed different from a speed of revolutions of the engine only when the power transference of the transmission is interrupted and the engine is driven;

program instructions that detect a state change of the motor while increasing hydraulic pressure applied to an engine clutch at a set ratio;

program instructions that calculate a torque transmission kiss point of the engine clutch based on the state change of the motor; and program instructions that apply the torque transmission kiss point of the engine clutch to a solenoid valve, wherein the transmission is an automatic transmission, and when the transmission is in park or neutral, the control unit determines that power transference from the transmission has been interrupted.

* * * * *